Oct. 8, 1957  J. WILSON  2,808,915
HAND BRAKE FOR RAILROAD CARS
Filed Nov. 23, 1953
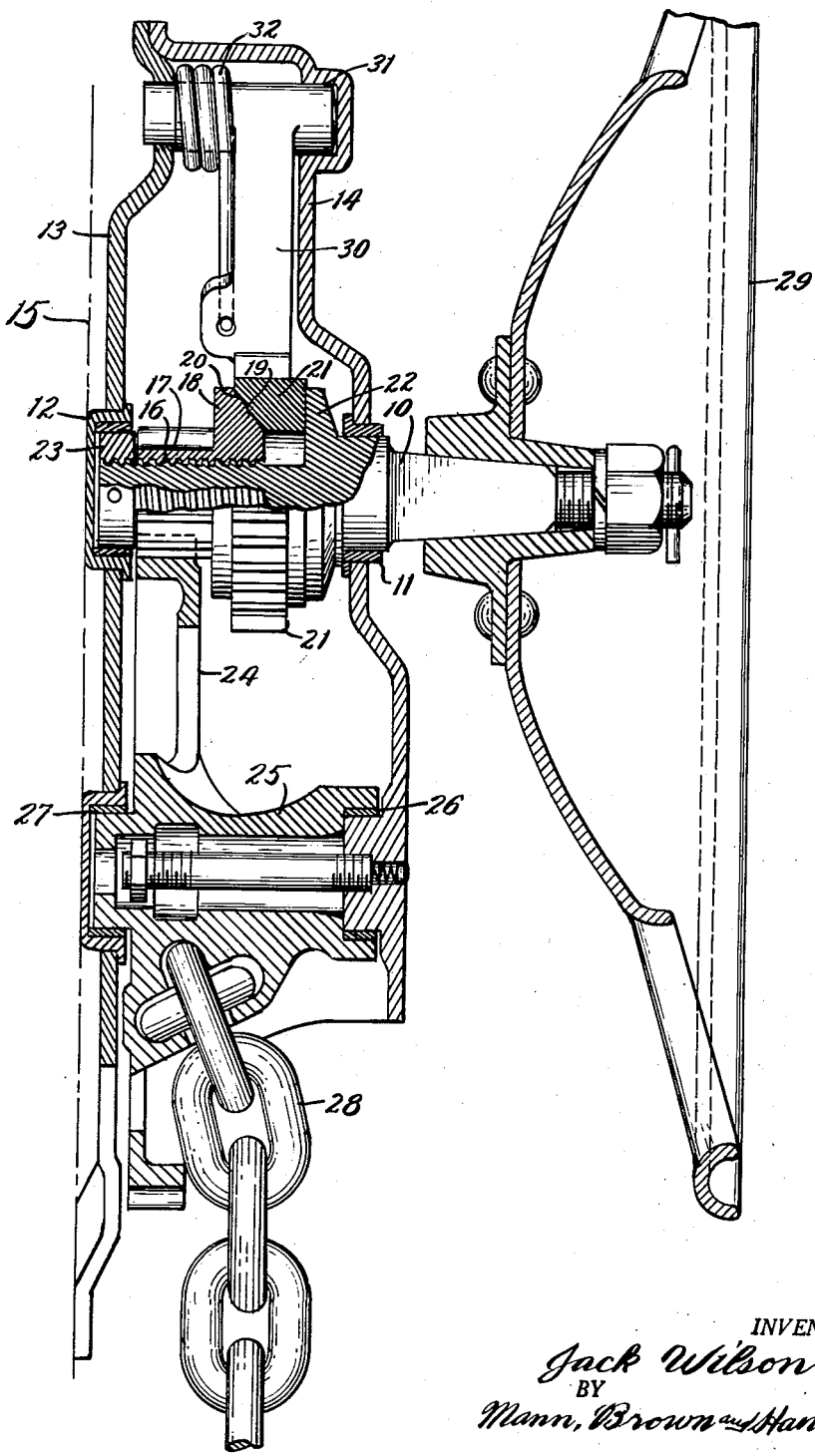
INVENTOR.
Jack Wilson
BY
Mann, Brown and Hansmann
Attys.

United States Patent Office 2,808,915
Patented Oct. 8, 1957

2,808,915

HAND BRAKE FOR RAILROAD CARS

Jack Wilson, Chicago, Ill., assignor to Universal Railway Devices Co., a corporation of Delaware Application November 23, 1953, Serial No. 393,736

2 Claims. (Cl. 192—16)

Heretofore, hand brakes equipped with friction clutches have not been proof against unwanted release when subjected to vibration caused by passing trains or car shakers.

The principal objects are to provide mechanism that will not release under vibration and will give safe and desirable control of intentional release.

Generally speaking, this is accomplished by placing a conical friction clutch between the hand wheel shaft and the driving pinion. When set up, the pinion functions as though it were keyed to the hand wheel shaft for setting the brakes. For release, counterclockwise rotation of the hand wheel shaft releases the clutch more or less, depending on the amount of rotation, and gives the brakeman full control. If the counterclockwise rotation has been excessive, he can correct the adjustment by clockwise rotation.

In the drawing:

The figure is a vertical section through a hand brake mechanism embodying the invention.

But this diagrammatic drawing is for the purpose of illustrative disclosure only, and is not intended to impose unnecessary limitations on the claims.

In the figure, 10 indicates a hand wheel shaft journalled in bearings 11 and 12 in a housing composed of a back plate 13 and a front plate 14 adapted to be mounted on the end wall of a car 15.

The hand wheel shaft is equipped with heavy right-hand threads 16 on which the pinion 17 is screwed, and the pinion has a clutch collar 18 provided with a conical surface 19 cooperating with a similar surface 20 on the holding ratchet 21, the right face of which is bound against the collar 22 on the shaft when the clutch is set up.

The inner end of the shaft 10 is provided with a bearing collar 23 received in the bearing 12.

The pinion meshes with a gear wheel 24 on a winding drum 25 journalled on bearings 26 and 27 in the housing and attached to a winding chain 28.

A hand wheel shaft is provided with a hand wheel 29 and the ratchet wheel 21 cooperates with a pawl 30 pivoted at 31 in the housing and urged against the ratchet by a spring 32.

When the brakes are to be applied, the hand wheel is rotated to the right or in a clockwise direction and through the threaded engagement with the pinion and its clutch collar sets up the clutch between the shaft, the pinion, and the ratchet wheel. As soon as the friction is sufficient, the pinion will drive a gear 24 and rotate the winding drum to take up and apply the brakes.

For release, a comparatively slight counter rotation of the hand wheel releases the clutch enough to slacken the brakes. However, the consequent rotation sets the clutch up again so that the brakeman has perfect control of the release through the hand wheel and the clutch.

In vibration tests, a cone clutch with suitable angles of friction surface holds under conditions where other clutches let the brakes release. Forty-five degree angles are ideal, but that may be varied between thirty-five and sixty degrees. At angles higher than sixty degrees, there is a tendency to slip, and at angles lower than thirty-five there is a tendency to freeze.

Double conical surfaces can be used to advantage, particularly in instances where space is at a premium, as disclosed in my companion application Ser. No. 393,737, filed of even date herewith.

I claim:

1. In a hand brake for railroad cars, a housing adapted to be mounted on a car, a hand wheel shaft extending through and journalled in the housing to rotate about a substantially horizontal axis, a ratchet wheel mounted concentrically on said shaft, a pinion concentrically mounted on said shaft in threaded relation thereon for movement toward and away from said ratchet wheel in response to rotation of said hand wheel shaft, said ratchet wheel and pinion carrying cooperating facing annular friction surfaces inclined at an angle in a range from 35° to 60° with respect to the horizontal axis to provide a vibration resistant conical friction clutch and hold the pinion to the hand wheel shaft, and a winding drum journalled in said housing parallel to the axis of rotation of said hand wheel shaft and in continuous driving engagement with said pinion.

2. The arrangement of claim 1 wherein said annular friction surfaces are inclined at an angle of substantially 45° with respect to said horizontal axis.

References Cited in the file of this patent

UNITED STATES PATENTS

| | | |
|---|---|---|
| 690,552 | Beck | Jan. 7, 1902 |
| 2,282,736 | Mersereau | May 12, 1942 |
| 2,310,135 | Van Cleave | Feb. 2, 1943 |
| 2,318,569 | Camp et al. | May 4, 1943 |
| 2,357,462 | Ferguson | Sept. 5, 1944 |
| 2,424,910 | Benson | July 29, 1947 |
| 2,561,139 | Sasgen | July 17, 1951 |